United States Patent
Handforth et al.

(10) Patent No.: US 8,160,613 B2
(45) Date of Patent: Apr. 17, 2012

(54) METHOD AND SYSTEM FOR HANDOVER IN CELLULAR WIRELESS USING ROUTE PROGRAMMING AND TRAINING PROCESSES

(75) Inventors: Martin Handforth, Kanata (CA); Guy Duxbury, Nepean (CA); Larry Marcanti, Allen, TX (US)

(73) Assignee: Rockstar Bidco, LP, New York, NY (US)

( * ) Notice: Subject to any disclaimer, the term of this patent is extended or adjusted under 35 U.S.C. 154(b) by 1068 days.

(21) Appl. No.: 11/303,991

(22) Filed: Dec. 19, 2005

(65) Prior Publication Data
US 2007/0142050 A1 Jun. 21, 2007

(51) Int. Cl.
*H04W 24/00* (2009.01)
*H04W 36/00* (2009.01)

(52) U.S. Cl. ..................... 455/456.3; 455/436
(58) Field of Classification Search .................. 455/436, 455/466, 412, 435.1, 437, 445, 439, 453, 455/513, 456.1–456.3; 370/331, 332, 320, 370/338, 392
See application file for complete search history.

(56) References Cited

U.S. PATENT DOCUMENTS

| | | | |
|---|---|---|---|
| 5,490,139 A | 2/1996 | Baker et al. | |
| 6,272,450 B1 | 8/2001 | Hill et al. | |
| 6,381,463 B1 | 4/2002 | Tu et al. | |
| 6,385,454 B1 | 5/2002 | Bahl et al. | |
| 6,405,050 B1 | 6/2002 | Amirijoo et al. | |
| 6,711,408 B1 * | 3/2004 | Raith | 455/440 |
| 6,768,447 B2 | 7/2004 | Franckart | |
| 6,801,850 B1 | 10/2004 | Wolfson | |
| 6,853,915 B2 * | 2/2005 | Hubschneider et al. | 701/209 |
| 6,895,329 B1 | 5/2005 | Wolfson | |
| 6,957,081 B2 | 10/2005 | Leyh et al. | |
| 6,968,271 B1 | 11/2005 | Wolfson | |
| 7,206,299 B2 * | 4/2007 | Matsugatani et al. | 370/331 |
| 7,239,618 B1 * | 7/2007 | La Porta et al. | 370/331 |
| 7,315,744 B2 * | 1/2008 | Achour | 455/453 |
| 2002/0028690 A1 * | 3/2002 | McKenna et al. | 455/517 |
| 2002/0065046 A1 * | 5/2002 | Mankins et al. | 455/59 |
| 2002/0065082 A1 * | 5/2002 | Yegani et al. | 455/452 |
| 2002/0193109 A1 * | 12/2002 | Kobayashi et al. | 455/430 |
| 2003/0069683 A1 * | 4/2003 | Lapidot et al. | 701/117 |
| 2003/0083075 A1 * | 5/2003 | Miyazaki et al. | 455/456 |
| 2004/0102195 A1 * | 5/2004 | Naghian et al. | 455/456.1 |
| 2004/0203865 A1 * | 10/2004 | Krasner | 455/456.1 |
| 2005/0088993 A1 * | 4/2005 | Jung et al. | 370/331 |
| 2006/0111123 A1 * | 5/2006 | Nerat | 455/456.1 |

* cited by examiner

*Primary Examiner* — Melody Mehrpour

(57) ABSTRACT

A method and system for managing handover where a database that receives location information about a moving object includes information regarding which base station is used in a current radio link connection and which base stations were used from historic radio link connections. Using the base station radio link history of the object and an electronic map, a processor coupled to the memory of the database selects which physical path the moving object is using. Upon matching the object's path with a history of path routes on the list, the processor will apply an optimized handoff sequence to the moving object. The optimized route can be derived from an algorithm that processes previous historical data from moving objects traveling on the same route. Methods of providing the location of moving objects via location sensors may be used to provide the database with higher resolution information about a moving object's location on an electronic map and allow further enhancement of the handoff optimization. Generally, location data is used to quickly determine which route the moving object is using and more quickly assign an optimized handoff sequence. Historical data along known routes can include time and spatial information to be processed by the routing algorithm. The database may reside in a central location or within each moving object or a combination of both.

9 Claims, 11 Drawing Sheets

METHOD AND SYSTEM FOR HANDOVER IN CELLULAR WIRELESS USING ROUTE PROGRAMMING AND TRAINING PROCESSES

FIELD OF THE INVENTION

The present invention relates generally to managing radio link handover in a cellular wireless environment. More particularly, the present invention relates to a method and system for selecting optimum base stations for operating range and data throughput within any small cell wireless system.

BACKGROUND OF THE INVENTION

Within cellular networks, handover of a mobile station from one base station to the next occurs via either soft handoff or hard handoff.

An individual base station has finite reach and finite bandwidth that result in deployment of multiple physically or directionally separated base stations to serve large areas or where there are high counts of active mobile stations. Multiple base station signals covering a common physical point may be separated into wireless cells by frequency band, time slots, spreading codes, spatial selectivity, or combinations of these four techniques.

When an active mobile station with a single radio moves from one cell to another, the mobile station has to switch between cells while it is within the region where the two cells both have coverage. This is done in order to minimize gaps in communication. With current technologies, either the mobile station will initiate the cell association transition when communications begin to fail on the existing link, or the mobile station will be commanded by the cellular network to change at what it believes is the appropriate time to the next frequency, timeslot, spreading code, or spatial selection in order to communicate with the new targeted cell.

Depending on the radio technology selected, the mobile station may only be able to communicate to just one cell at a time. In that case the previous cell connection must be dropped before the connection is made to the new cell. These types of cell-to-cell changes are termed a hard handoff, so called because once the handover is started there is no going back—i.e., there is no "soft time" when the radio client is communicating to more than one cell where the system could decide to move back and forth several times between the cells.

Where the mobile station is managing the changeover, it can take considerable time (i.e., several seconds), especially in a crowded radio frequency (RF) band, to search for the next best cell with which to communicate. There are also smaller delays associated with negotiating with the next cell for communication rights. During this time, if the system is only capable of hard handoffs, communications are lost If the mobile station has the ability to communicate with more than one cell at a time an alternative handover technique can be used where before communications are dropped to the old cell, communications are initiated and setup completed to the new cell.

Soft handoffs are typically used on large cellular networks with cells covering many kilometers, the delay associated with searching for the next best cell is largely eliminated by having a central controller determine when is the optimum time and which cell is next to be used while the mobile client is still communicating on the old cell. The time to change cells is determined by measuring the wireless loss between the mobile client and all cell towers that detect the mobile stations signals. The relatively slow fading of the signals in such a system allows sufficiently accurate predictions as to when the mobile station will reach the effective edge of the existing and new cells. Although rough location of mobile clients is determined by the same mechanisms, the algorithms are power and time trend based rather than location based.

An example of a technology where soft handover can be done without going to the expense of having a completely duplicated radio section is Code Division Multiple Access (CDMA) where the signals from more than one cell can be separated from within in single frequency receive band. The mobile station has a single RF receiver that converts radio frequency down to baseband, but assigns a specific spreading and despreading code to each user. These codes allow the required signals to be separated from other signals by correlation.

In addition to the use of spreading and de-spreading codes commonly a "rake receiver" with multiple narrow band filters (fingers) is used. This allows strong interference signals to be eliminated but also allows more than one adjacent cell to operate on the same frequency if each cell base-stations rake settings are coordinated to be different to adjacent cells. The single RF receiver picks up all of those that are within range allowing communication to more than one cell at a time Commonly, when the active mobile station is about halfway between two base stations, the mobile station handles transport of data back and forth to the cell along with actively looking for other cells. When the mobile station finds a base station with sufficient signal strength, the mobile station informs the network accordingly. The network might decide at that point to route the call through both base stations simultaneously such that the handoff process happens in multiple steps when the active mobile moves from one cell to another. First the mobile station notices a receiving base station, which then begins to carry the call in addition to the originating base station. As the mobile station continues to move, eventually the signal strength from the originating base station will drop to the point where it is no longer useful. Again, the mobile station will inform the network of this fact and the originating base station will be dropped in a soft transition. Thus, such a transition is termed soft handoff.

Typical soft handover systems require a centralized handoff control system with extensive knowledge and control of all base stations. This is not always practical especially when working within a large number of low cost standalone base-stations are used. Some current technologies which normally do not include a centralized handover mechanism are WiMAX, WiFi, WirelessMAN™, ZigBee™. WiFi® is a short range low cost best effort wireless data networking standard based on IEEE Standard 802.11. Typical WiFi® data rates are around 3 Mb/s but in excess of 100 Mb/s is targeted. ZigBee™ is a wireless networking standard based on IEEE Standard 802.15.4 that is aimed at remote control and sensor applications and is suitable for operation in harsh radio environments. WiMAX and WirelessMAN™ protocols are currently defined through IEEE Standard 802.16 where a wireless metro area network (MAN) provides network access to buildings through exterior antennas communicating with central radio base stations. The wireless MAN offers an alternative to cabled access networks, such as fiber optic links, coaxial systems using cable modems, and digital subscriber line (DSL) links.

Conventional handover techniques over time, allow more radio inter-cell transfers to occur than necessary and that reduces overall network efficiency. Further, conventional wireless networks utilize a large number of base station radio links where momentary radio links can cause disruptions to both data throughput and management of data flow through the network.

Loss of signal in many small cell applications can be of significant consequence. For example, real-time video feed from a mobile wireless video camera for surveillance applications can require significant amount of memory buffering and consequent latency in order to be able to prevent such loss of signal resulting in data corruptions. It would therefore be desirable to provide a mobile station handover in a small cell environment in a more predictable manner similar to soft handoff to alleviate fading problems, resultant signal degradation, or communications failure in terms of, but not limited to, complete loss of signal.

When cells become much smaller i.e. have individual cell coverage areas under a km in diameter (micro-cell), or even just a few meters in diameter (pico-cells), the radio transmissions when exposed to the typical multiplicity of dynamic elements which reflect and shadow significant amounts of RF power, the location of the usability edge of cells becomes very much more difficult to determine by conventional signal power loss techniques. In such cases, signals may fade to nothing in a fraction of a second or over just a couple of meters. Especially with micro-cell and pico-cell systems, knowing exactly where to initiate handoffs becomes critical and requires a more accurate mechanism than is currently available in large cellular systems. This applies to both systems with hard handoffs and systems with soft handoffs.

SUMMARY OF THE INVENTION

It is an object of the present invention to obviate or mitigate at least one disadvantage of previous handover techniques especially within small cell networks. The present invention provides improved handover that can be used where a mobile station is traveling closely to a known path at limited speeds. Moreover, the present invention involves generating and using an electronic map indicative of switching points for optimized handover.

It is, therefore, desirable to provide a method of managing handover within a radio cellular environment, the method including: determining an identification of a mobile station that is known to normally follow a predetermined route corresponding to the identification; comparing the identification with a database having stored maps of known route segments including a list of base stations along each of the known route segments; and assigning a preferred sequence of base stations corresponding to one or more of the known route segments along the predetermined route.

In a another aspect, the present invention provides a method of optimizing a managed handover technique within a radio cellular environment, the method including: determining an identification of a mobile station traveling along a path, the mobile station having no previous history of base station connectivity; as the mobile station establishes a connection with a base station, associating, based upon the base station being used by the mobile station, the identification with a known route selected from a database having stored maps of more than one the known route including a list of base stations along each the known route; as the mobile station disconnects from the base station and connects to a subsequent base station, storing historical information regarding the base station and the subsequent base station; comparing the base station and the subsequent base station to the list of base stations along the known route in order to identify one or more of the known routes that include both the base station and the subsequent base station; repeating the storing and comparing steps for further subsequent base stations, until only one of the known routes remains and corresponds to the path traveled by the mobile station; determining whether a direction of travel of the mobile station along the path is forward or reverse along the known route that corresponds to the path; identifying one of the stored maps from the database that correlates to both the direction of travel and the known route remaining that corresponds to the path traveled; and assigning a preferred sequence of base stations corresponding to the one of the stored maps for all further connections with the mobile station along the path.

In a further aspect of the present invention, there is provided a system for managing handover in a radio cellular environment, the system including: a centralized communications center having a base transceiver, a central server, and a database; a mobile station having one or more transceivers capable of communication with the centralized communications center via one or more base stations, the mobile station being assigned a preferred sequence of the one or more base stations corresponding to one or more known route segments along a predetermined route followed by the mobile station.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached figures.

DETAILED DESCRIPTION

Generally, the present invention provides a method and system for managing radio link setup and disconnect between base stations and subscriber stations. The present invention alleviates disadvantages of especially small cell wireless protocol that do not have handover protocol. The present invention avoids use of conventional handover techniques so as to prevent excessive radio links from occurring. The present invention is useful, among other applications that will become apparent to one of ordinary skill in the art of networking, in applications where the subscriber station (e.g., mobile station) follows a known route that has a series of base stations along and beside the same route. The present invention includes methods for selecting the optimum base stations for best operating range and data throughput. Ideally, the present invention assists in reducing control traffic as such control traffic often reduces actual payload capacity. The present invention also minimizes or substantially eliminates association time to perform handover that, for example in IEEE 802.16(d), can be around 15 seconds. The present invention also substantially eliminates short-term connections in the network and optimizes data throughput to each mobile station.

Broadband wireless in small cell protocol settings (e.g., 802.16) includes a variety of applications. However, for purposes of clarity, the illustrative embodiment discussed herein will be drawn to the security application of real-time video on city busses within a downtown core. Such security video application is a high bandwidth system transmitting in real time over a wireless system where fading rates must be kept low for real time dependable video links. Learning, or deducting, the preferred routes in order to predict fading and use the most appropriate choice of base station is a desired goal of the present invention, as is minimizing the number of base station radio links used. This increases overall efficiency, radio resource usage, and prevents loss of links. Specifically, momentary radio links cause disruptions to data throughput and management of data flow through the network. The present invention allows the use of radio protocol standards that do not have handover protocol as part of the standard. While such specific implementation is discussed in terms disruptions to a video security application on city busses, it should be readily apparent that the present invention is intended for any other application operating within an environment with rapid and unpredictable fading and should not be considered limited to a bus security application.

Figure 1:
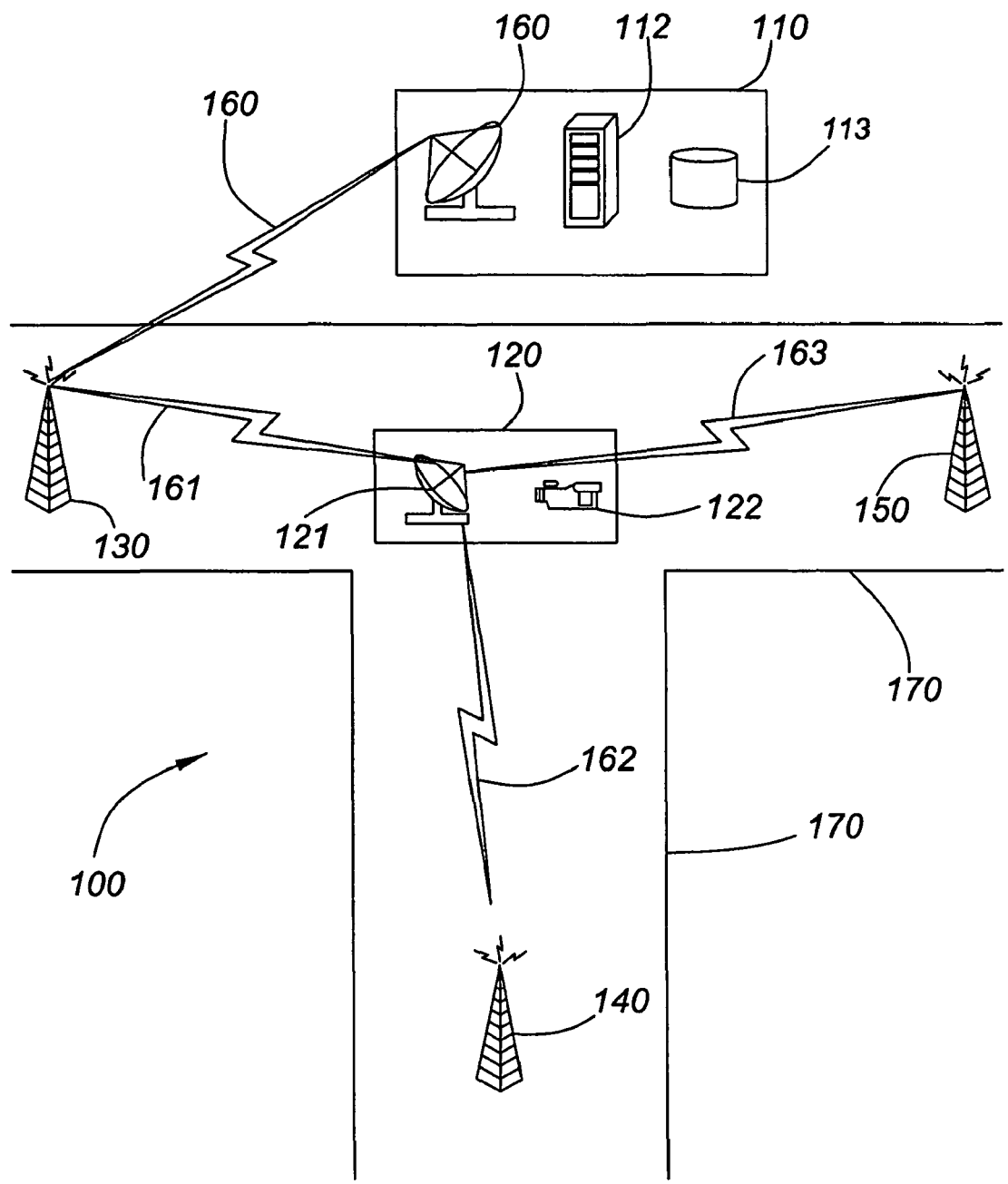
FIG. 1 is a simplified schematic of a small cell radio environment having a mobile subscriber station (MSS) situated within a simplified illustration of a bus in accordance with one example of the present invention.

With regard to FIG. 1, a simplified schematic of a radio cellular environment 100 is shown having a mobile subscriber station (MSS) 121 situated within a simplified illustration of a bus 120. The MSS 121 may be any suitable radio transceiver with one or more antenna. The antenna may be directional such that if two antennae are used, they may be directed in opposite directions. The MSS 121 itself may be mounted atop and external to the bus 120. Alternatively, the antenna(e) operating in conjunction with the MSS 121 may be external to the bus, while the processing circuitry of the MSS may be located separate from and internally within the bus 120. Further, the MSS 121 may include more than one radio transceiver such that one may be dedicated for radio link management and another may be dedicated for data transfer. Such implementation details regarding the MSS 121 specifics will not be described further as such would be considered well within the knowledge of one of ordinary skill in the art of radio transceivers.

The MSS 121 operates in communication with sensor mechanism such as, but not limited to, a video camera 122. As appropriate to the security application of the present invention, the video camera 122 is discreetly located for viewing occupants of the bus 120. It should be understood that more than one security camera may be used within the bus and may be co-located with any other type of sensor mechanism including, but not limited to, noxious gas detectors, infrared heat sensors, or any device capable of detected a security-related characteristic within or near the bus 120. For purposes of clarity, such devices are not further described herein. The video camera 122, or any related device, is coupled to the MSS 121 by any means that provides a high data transfer capability. This may include hard wiring or wireless communication transmitter within the video camera 122, or device, via a low range wireless protocol.

As the bus 120 travels along its route, the MSS 121 also moves along such known route. Base stations 130, 140, and 150 are located within the radio cellular environment 100 along the possible bus routes illustrated generally by streets 170. A centralized communications center 110 exists within the radio cellular environment 100. The centralized communications center 110 may function within a closed network or may be connected to the Internet, public switched telephone network (PSTN), local area network (LAN), wide area network (WAN), metro area network (WAN), or any one or combination of networks. The centralized communications center 110 includes at least a base transceiver 111, a central server 112 with appropriate processing capability, and a database 113 for storage of route information. The base transceiver 111 is in wireless communication, via a small cell protocol as discussed hereinabove, with base stations 130, 140, 150. It should be understood that a variety of configurations may exist in an actual physical setting in a cityscape, but for purposes of clarity only three base stations and a single T-intersection are shown in FIG. 1.

With reference to the simplified radio cellular environment 100 shown in FIG. 1, the innovative operation of the present invention involves managed handover of the MSS 121 from one base station to another while the bus 120 travels along streets 170. Radio links 160, 161, 162, and 163 are shown and illustrate the fact that, at certain points of travel, the MSS 121 is capable of communication with more than one base station. In this instance, base station 130 is connected to the MSS 121. Further, base stations 140 and 150 are active, though not connected to the MSS 121. As shown, the MSS 121 is in communication with the central base transceiver 111 via radio links 160 and 161 as the active connection is via base station 130. When the bus 120 enters the intersection, base station 140 will attempt a handshake with the MSS 121 via radio link 162. Due to the proximity of base station 150 when the bus 120 enters the intersection, the base station 150 will also will attempt a handshake with the MSS 121 via radio link 163.

In terms of the radio cellular environment 100 as a whole, the resources related to radio links 162 and 163 can be considered duplicative and disruptive. This is readily apparent if one considers the path of the bus 120. If the bus were to travel in the direction from base station 130 to base station 150, there would be no need for any use of radio link 162 because handover would ideally occur from radio link 161 to radio link 163. Alternatively, if the bus were to make a right turn and then travel in the direction from base station 130 to base station 140, there would be no need for any use of radio link 163 because handover would ideally occur from radio link 161 to radio link 162. In actuality, the path of the bus 120 is normally a known route. For example, an East-bound #1 bus may take the known route from base station 130 to base station 150, while a South-bound #2 bus may take the known route from base station 130 to base station 140. The #1 bus would therefore have a certain predetermined and known route uniquely tied to its identifier (i.e., #1), while the #2 bus would therefore have a different certain predetermined and known route uniquely tied to its identifier (i.e., #2).

In accordance with the present invention, the known routes are correlated to the sequential list of base stations to be used during the travel of the bus 120 through its corresponding route. As should be apparent from FIG. 1, different known routes will result in different sequences of base stations. Still further, it should be understood that the sequential list of base stations used might not always reflect base stations with the strongest signal relative to the given position of the MSS 121 along the path of travel. Rather, each base station is selected based upon the actual known route traveled. This may require that some very strong base station links should be ignored, while weaker links may be sought. In terms of the FIG. 1, if the bus 121 were traveling in a known route from base station 130 to base station 150, then radio link 162 should be ignored upon handover from base station 130 to base station 150 even if radio link 163 is stronger than radio link 162. If radio link 162 were to handover to connection of the MSS 121 to base station 140, even momentarily, this would inefficiently use radio resources as link setup and teardown between the central transceiver 111 and base station 140 would occur.

Because the bus 120 passes the T-intersection rather momentarily, even a temporary loss of signal could be tolerated given the predictability of the known route and the impending link setup with radio link 163 as the bus travels towards base station 150. In such instances of such a temporary loss of signal, it would be well within the intended scope of the present invention to provide a memory buffer on-board the bus 120 integrated or otherwise coupled with the sensing device (i.e., video recorder 122) and/or the MSS 121. Such on-board memory buffer would also be part of on-board memory as a whole that would provide storage of the sequential list of base stations. Further, the on-board memory may be capable of storage of one or more of the sequential lists of base stations depending upon the preferred route used by any given bus. In this way, a single bus may be used for any one of several known routes where the sequential list of base stations may be selected given the route identifier.

In further accordance with the present invention, a collection of all known routes and the related sequential lists of preferred base stations can be centrally stored at the central communications center 110 within a database 113. Such stored known routes may be in the form of route maps, lookup tables, or any suitable storage format. The known routes may also be broken into smaller segments, or steps, that would correspond to unalterable sections of any given known route. In this manner, centralized computing intelligence at the central server 112 can build a map from known route segments and provide such map to the MSS 121 such that the MSS 121 follows a sequential list of preferred base stations by way of a managed handover along a chain of each base station in the list. It is well within the intended scope of the present invention to provide the central server 112 with the computing intelligence to recombine known route segments to build maps that may vary according to the path of the bus. Building such varying maps may be done in several ways including, but no limited to, real-time reassessment of the bus' geographical location, speed, direction, or time-of-day, or exigent circumstances, or any other similar variable that may require route deviations on-the-fly.

The computing intelligence would preferably be located at the central server in order to reduce the amount of control data sourcing from the MSS 121. However, some level of computing intelligence may exist on-board the bus 120 such that one or more known route segments may be utilized to if the bus were to deviate from the known path associated with its identifier at a time when loss of signal to the central transceiver 111 occurs. Such occurrences could of course be the result of an unexpected or unwanted deviation of the bus 120 from its path. In such instances, maintaining the radio link and related transfer of video and/or any other sensed data would be a priority.

Figure 2:
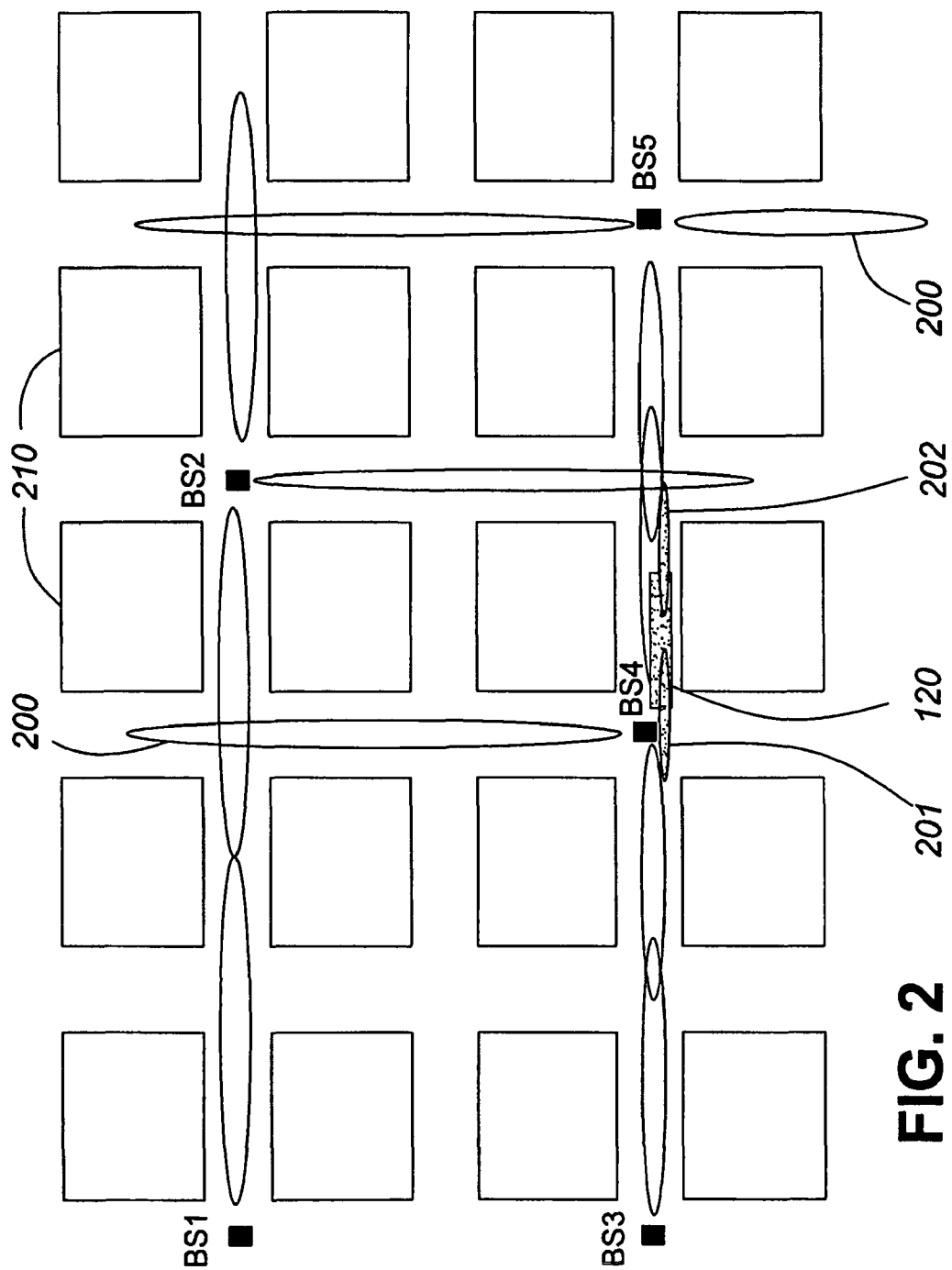
FIG. 2 is a simplified schematic of a downtown core with buildings and multiple base stations in accordance with another example of the present invention.

In operation, the method in accordance with the present invention includes handover along a route to provide wireless access along the route. FIG. 2 shows a simplified schematic of a downtown core with buildings 210 and five base stations BS1 through BS5 though more or less base stations may be involved. As well, the buildings 210 may of course be of varied shapes and sizes such that streets therebetween may vary from the simplified grid pattern as shown in FIG. 2. For purposes of illustration as well, it is assumed that the buildings 210 are infinitely tall such that radio links 200 from with the base stations are narrowly formed in terms of their effective beams. This is therefore representative of the fact that a downtown radio environment among tall buildings is a limited radio environment that can include constrained radio beams with related signal voids and fading problems. The location, and hence availability, of each base station BS1 through BS5 are programmed into the central server 112 (shown in FIG. 1) that is accessible by the MSS and base station. Each MSS and base station has an identifier (ID), MSS-ID and BS-ID, respectively. The MSS-IDs and BS-IDs and the use of training sequences or preprogramming enable the creation of stored maps or lookup tables used to establish optimum links.

As the bus 120 moves and the corresponding MSS traverses along the known route applicable to the given MSS, the MSS will look for the next BS-ID in the known route sequence. Once the next BS-ID is found, the MSS establishes a new radio link with that BS and will ignore any other radio links. In terms of FIG. 2, this would mean that the BS-ID of BS2 would be ignored when the bus 120 travels the known route from BS3 to BS5. It is important to note that any other radio links are therefore ignored regardless of the fact that they may have sufficient radio signal strength. Such other radio links are ignored because they do not have the expected BS-ID. This is a useful aspect in regards to environments such as a downtown core with multiple radio links interspersed among a canyon of tall buildings.

As mentioned, each MSS follows a known route where the known route can be considered a series of repetitive steps within an environment of multiple radio links. Each step may be represented by traveling a certain distance in a certain direction for a certain period of time at a given rate of travel. When two or more such steps are repeated in series, they therefore from a predictable route. While such routes may in fact deviate slightly due to traffic, construction, or some other obstacle or situation, only a portion of the route would use a differing step from the known route. Such a detour along the route could be permanent, temporary, or varied in term. Deviation from the known route may of course be related to a host of variables including, but not limited to, time of day, weather conditions, or emergency situations.

Each known route and its constituent series of steps must initially be determined in accordance with the present invention. A training process would therefore be utilized within the present invention. During the training process, one or more MSS follow a repetitive route that has a series of base stations along and beside the route. Each MSS identifies the optimum base stations to use that provide best reach and data throughput. It should be noted that best reach and data throughput may not mean that the base station with the strongest signal is identified. Rather, identifying the most appropriate base station for any given MSS should also consider the path taken by the MSS.

For example, turning a corner may enable an MSS to identify a weaker base station and a stronger base station. However, due to the direction of travel of the MSS, the weaker base station may strengthen as the MSS travels towards it. Likewise, the stronger base station may then fade as the MSS travels away from it. This would result in the preferred base station for handover receipt actually being the base station that was weaker at the time of turning the corner. The inventive training process would identify all such situations and effectively create a map of which base station to use along any given route. The map may be a stored list of a series of base stations. Each map may have slightly differing versions that allow for the possible deviations mentioned above along any given known route. Still further, each map may be reversible such that a route can be traveled in reverse with the knowledge of the appropriate series of base stations. Such reversible maps would be useful in terms of inbound and outbound busses traveling along the identical streets.

The training process therefore produces maps of each known route traversed by the MSS that identifies each appropriate base station to use to ensure robust operation of broadband service between the MSS and the network. Because each MSS may likely only travel one particular path with some possible list of deviations, only a small group of known paths and related stored maps are needed for any given MSS. In terms of a bussing schedule, a downtown express with an 8:15 AM start time and 9:30 AM finish time may only require, for example, five or six possible paths. Each path would be determined by a training process to form the five or six known routes stored as maps. Each of the five or six maps would preferable be stored onboard the MSS. Because the same bus may be used for other routes, the onboard storage of the MSS would therefore be rewritable such that each MSS is programmable. Collectively, multiple maps for many different known routes and their respective deviations would exist. The collective maps would reside on a central server.

During the training process, the MSS would write the data forming a map to a central server for central storage. Training on a different route would therefore collectively add to the data to form the collective maps centrally stored on the central server. Once all routes are mapped and stored, the training process becomes a lesser function of the present invention. Only situations where new routes due to, for example, revisions to demographic changes or expansion to city infrastructure and related revised bus schedules would require a new training process to occur. Once all known routes and deviations are mapped and stored with regard to the appropriate base station sequences, the present invention would manage handover throughout the entire network in a predictable and efficient manner. Fading and related loss of signal could therefore be controlled and minimized. This is due to the information regarding the most appropriate link handovers being passed to the network to enable data throughput optimization when there are more than one MSS linked to a base station or more than one base station linked to an MSS.

It is also an important feature of the present invention that any MSS can obtain a priority bandwidth for emergency services. This can be accomplished by using the centrally stored map information for the known routes and their constituent segments, or steps. For example, a bus (i.e., MSS) may significantly deviate from its typical known route especially during an emergency. In such instance, the MSS will request a priority bandwidth. The priority bandwidth may require identification of a new map including a base station sequence that deviates from any previously mapped and stored known route. The new map may be instantiated based upon the MSS location, path, speed, or other relevant information alone or in combination, and formed from the various known steps within each known route. This would require processing intelligence at the central server in conjunction with a location detection means.

The processing intelligence could be in the form of a central processing unit (CPU). The location detection means may be in the form of a global positioning system (GPS) device; in-road sensor element such as, but not limited to, buried resonance coils; wheel rotation measurement devices; triangulation computing devices; or any similar mechanism or combination of mechanisms that can sense the location, path, and route of the MSS and convey such information to the processing intelligence. Further, the location detection means may be also be of the type disclosed within U.S. Pat. No. 6,965,827 issued to Wolfson, herein incorporated by reference.

The training process of the present invention may be an adaptive training with or without GPS. The initial bus trip training includes switching to discovered base stations with the strongest signal as and when fading requires a change. In addition radio link parametrics are stored in the central database (element 113 in FIG. 1) containing known radio paths, duration of links, and whether operational location information (GPS or a similar location detection means) is available. A first pass through a route by the MSS defines the approximate potential end points of each link's capabilities. On the second pass over the same route, the training algorithm attempts to link to the furthest base station along in the previous link sequence. This gives the approximate potential start points of each link. On subsequent passes and during normal operation, the links to be used are selected based on a combination of the average historical duration of the radio link and effective radio link throughput. In particular, where the link duration is small compared to acquisition times, it may be determined that to switch to a particular link although strong is not appropriate. On each subsequent trip link, range and performance are determined and averaged into the database 113. Where the radio system environment 100 has multi-channel capabilities, the inactive channel is used to search for alternative links. If an expected radio link is missing on a trip the next best base station can be used. The database 113 can also be used to analyze base station deployment location improvements and resiliency to failure.

Figure 3:
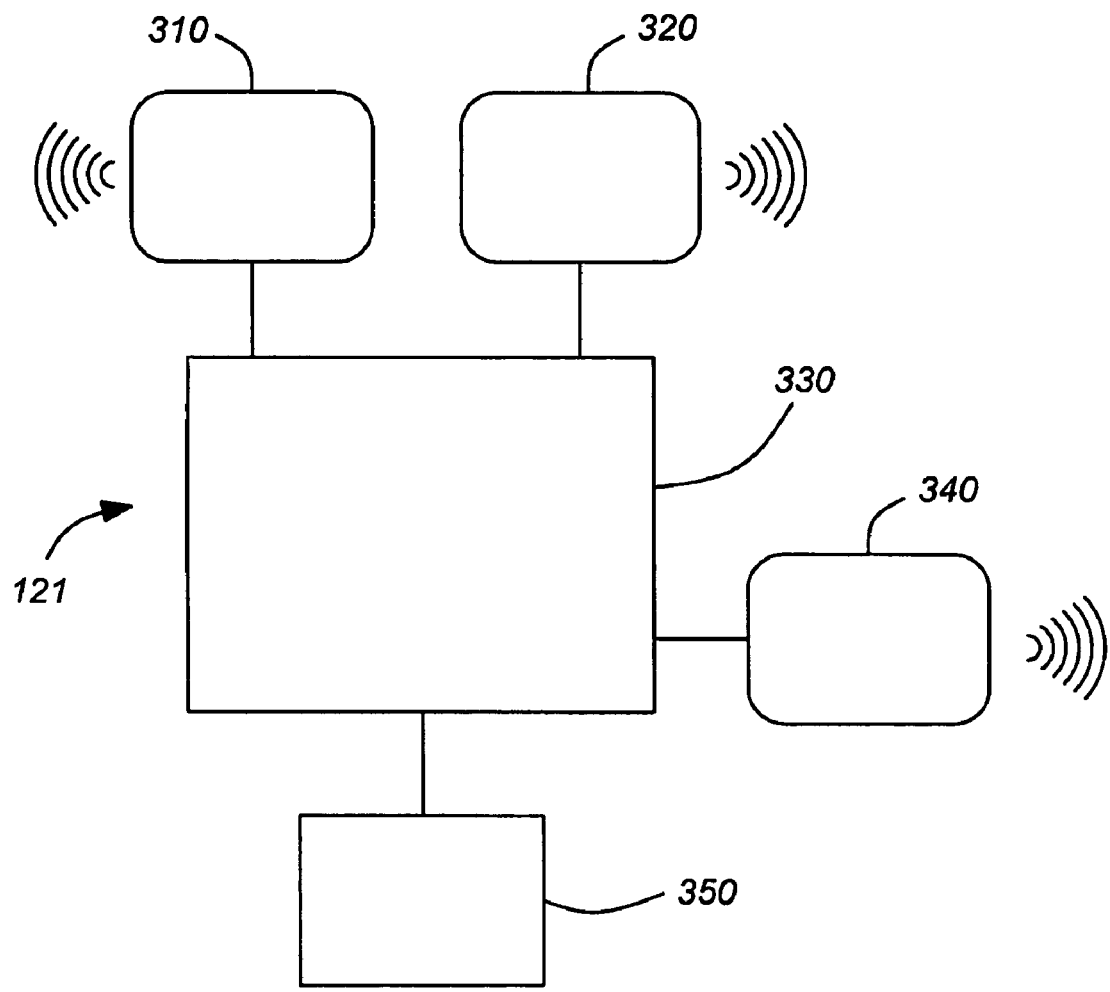
FIG. 3 is a simplified schematic shown in block diagram form representing the MSS such as in FIG. 1 in accordance with one example of the present invention.

Alternatively, a flexible route operation with GPS is possible. In a flexible route operation, an optimum radio link for any given MSS can be modified for varying routes as long as each section (i.e., segment) of the route taken has been mapped by a previous bus route. When a path change is detected the database is searched for an optimum path to radio link mapping for that route subsection (i.e., route segment). Modification of selected links in terms of the preferred sequence of base stations can occur due to knowledge of proximity of other buses. Moreover, the inventive methodology can be further modified to include allowing for base station loading from other MSSs. With reference to FIG. 3, a schematic is shown in block diagram form representing the MSS 121. As mentioned above, the MSS 121 may include one or more transceivers that may be oppositely directed (i.e., forward/backward in terms of bus direction).

As shown, transceiver 310 and 320 are connected to a controller 330. The transceivers 310 and 320 may function under any radio cellular protocol operating within the radio cellular environment of the present invention. The controller 330 may include a multiplexer for Internet protocol (IP)

packet routing along with a multimedia communications server (MCS) and/or IP-Based multimedia subsystem (IMS) for policy control, session control, and quality of service (QoS) control. As previously described, the MSS 121 may involve some level of on-board intelligence 350 that may be in the form of a database and CPU. The on-board intelligence 350 could store known route maps and/or segments for any given known route or portions of known routes related to the given MSS-ID assigned to the MSS 121 where differing bus routes would equate to differing MSS-IDs. Further, a location detection means 350 is also shown connected to the controller 330. Preferably, the location detection means 350 is a GPS device and is therefore shown with related radio link.

The processing intelligence in accordance with the present invention may also provide for bandwidth and channel allocation to each MSS based on overall network load sharing to optimize performance. In such instance, the information obtained by the location detection means along with the stored maps regarding the known routes can be used to manage load sharing. Moreover, it should be understood that the processing intelligence in combination with the location detection means can be used in either the initial training processes for each MSS route or in updating or augmenting the centrally stored maps via further training. It is also within the intended scope of the present invention to provide a training process that can augment the centrally stored maps in such a manner so as to eliminate or change a base station from any given route where that base station causes a reduction in data throughput to the network (i.e., bus community).

Figure 4:
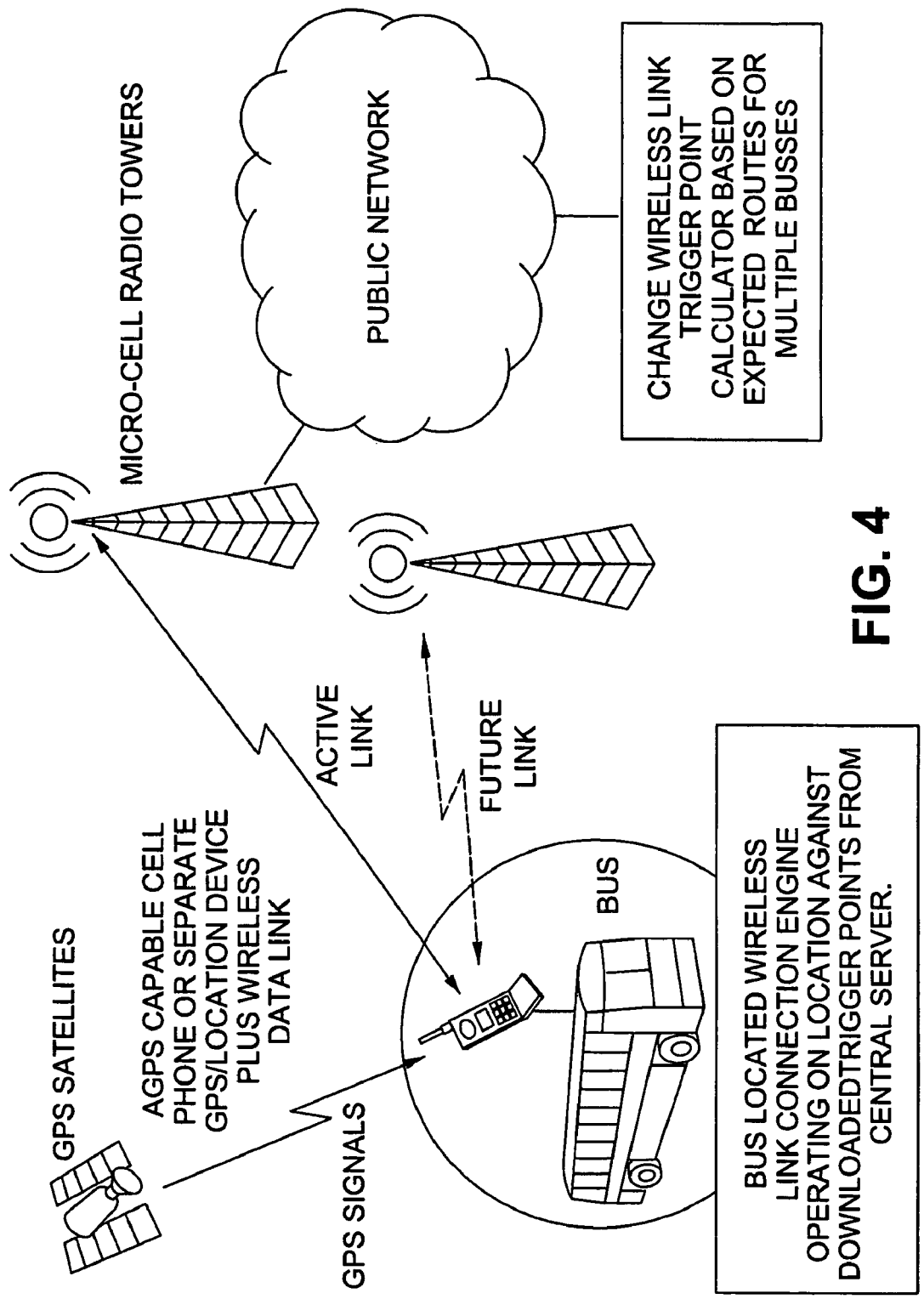
FIG. 4 is a basic system network diagram in accordance with the present invention.

As mentioned above, GPS may be utilized to locate the bus in its location along. The location and relative movement of the bus can therefore be determined with information using GPS or AGPS if the MSS incorporated an AGPS-capable cell phone or was otherwise AGPS-capable. FIG. 4 shows a basic system network diagram in some detail utilizing a GPS satellite network via either an AGPS cell phone or GPS device. Either location mechanism would locate the bus and communicate with a central server to determine one or more possible future links to the bus based upon knowledge of the current active link, bus location, and related expected routes. Various locations along any given route can be designated as trigger points, or switching points, that would indicate the specific location of a bus where handover will be predetermined to occur. The maps stored at the central server already mentioned above would effectively form electronic maps of suitable switching points. Any change in the wireless link would be based upon a trigger point calculator based upon the expected routes for one or more busses at that location. Though the electronic maps of suitable switching points would normally reside at the central server, it should be understood that such maps may be downloadable to the MSS on the bus in any part or whole necessary to effect optimal handover on any given route.

Figure 5:
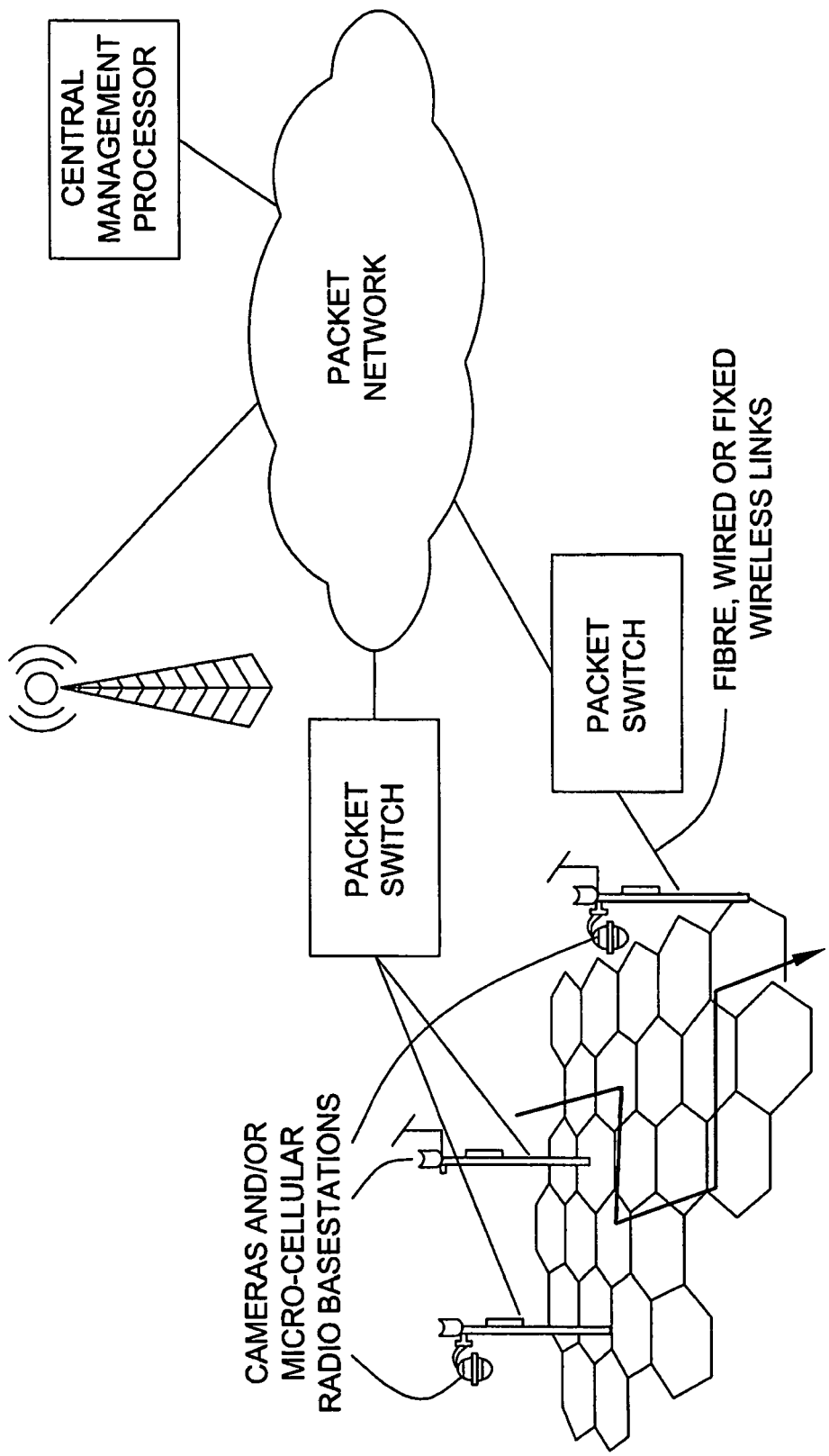
FIG. 5 is schematic showing the wireless micro-cell handover control details from a different level than FIG. 4 in accordance with the present invention.

FIG. 5 is schematic showing the present invention from a different level than FIG. 4 and includes wireless micro-cell handover control network. A honeycomb pattern illustrates a typical cell arrangement of reception zones with a possible bus route therethrough. Micro-cellular radio base stations are also shown represented by lampposts on which such base stations are commonly mounted. Multiple cameras may also exist at one or more lamppost. The cameras and/or base stations may be linked in some wireless or fixed (e.g., optical fiber) manner to a packet network. The packet network may communicate the Internet as a while via a wireless link to a cell tower shown, for example, as a third generation (3G) WiMAX tower. The central management processor for handover control is shown to reside in the packet network. Communications between the base stations and the central management processor are therefore based on packet switching.

Figure 6:
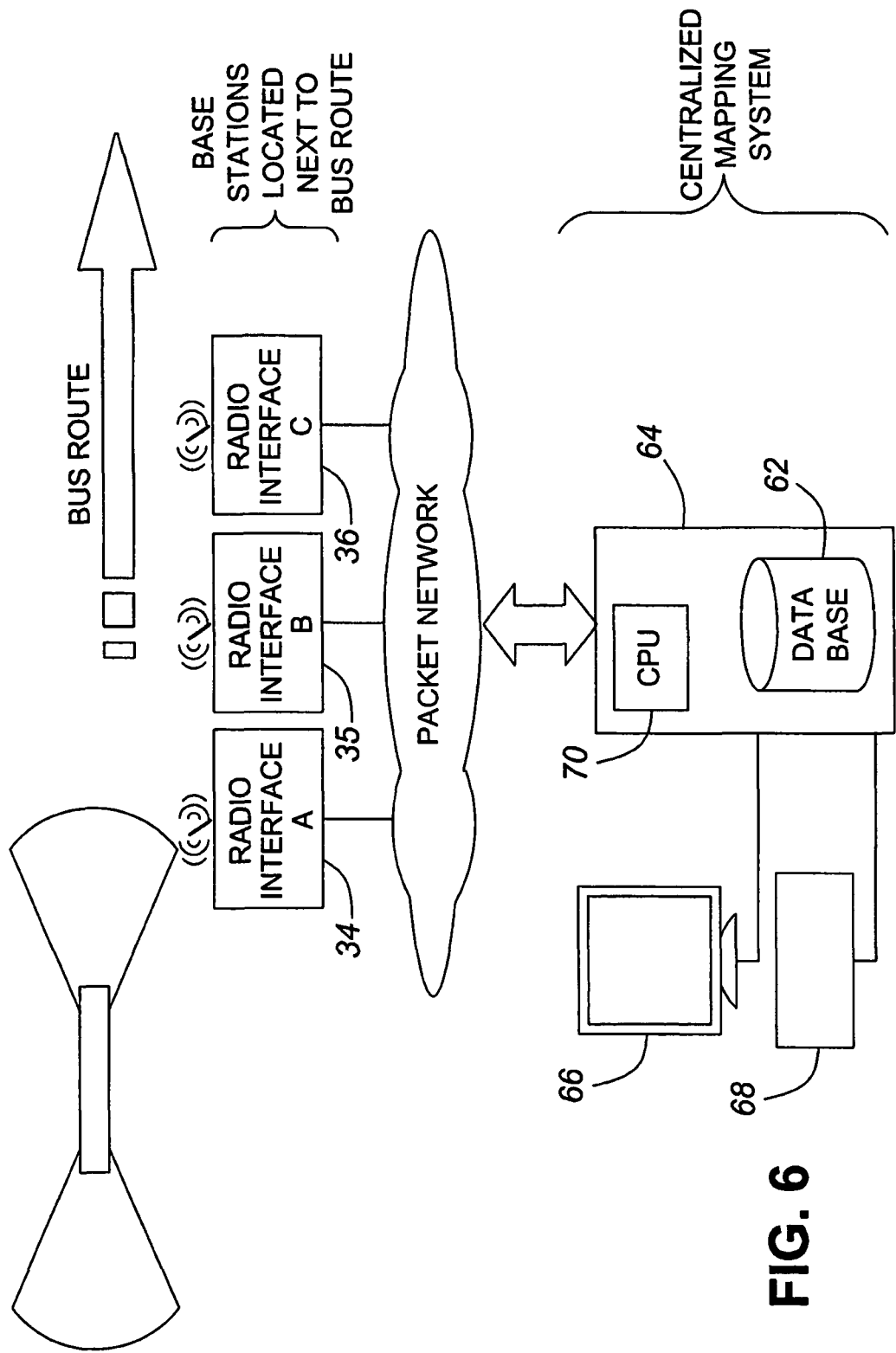
FIG. 6 is a basic configuration showing handover with centralized mapping of one or more shared databases in accordance with the present invention.

FIG. 6 is a simplified linear view similar to FIGS. 1 and 2 and shows a basic configuration of handover in accordance with the present invention with centralized mapping. As a bus moves along a bus route, the bus will encounter a series of base stations 34, 35, 36, that form a radio interface between the bus and the packet network. The packet network in turn communicates with a centralized mapping system. The centralized mapping system may include a mapping mechanism 64 with processing intelligence in terms of a CPU 70 and one or more databases of electronic maps of switching points in terms of database 62. Further, a system management interface for monitoring handover may be provided in terms of some graphic user interface 66 and data input mechanism 68 to facilitate central control of the invention by a system operator. As the bus moves along the bus route, it should be readily apparent that communications between the bus and the central mapping system will migrate from radio interface A to radio interface B to radio interface C. The central mapping system ensures that switching points are adhered to in accordance with the electronic maps stored in the database 62 such that precise handover occurs at the optimum location for the given route.

Figure 7:
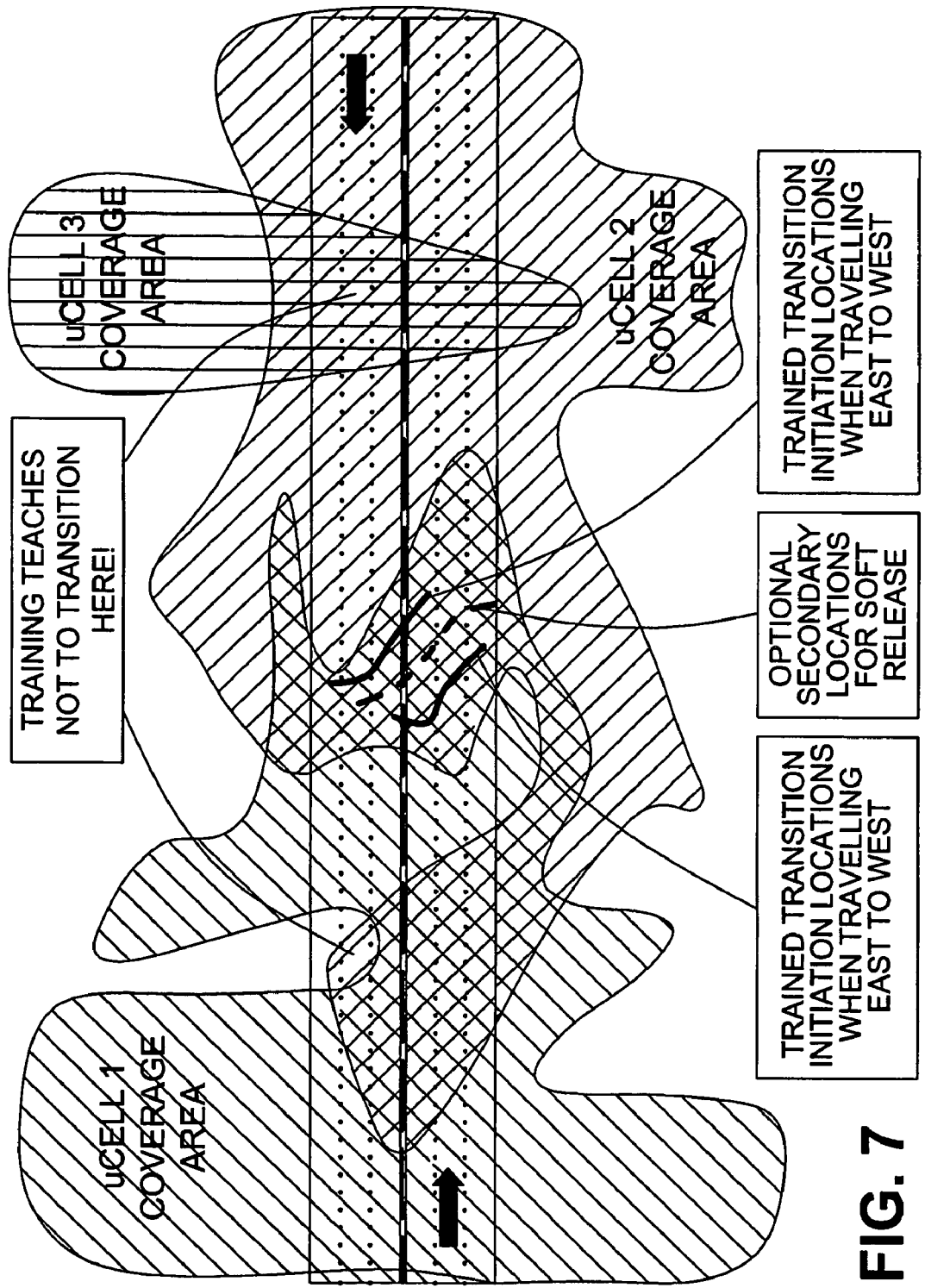
FIG. 7 shows a micro-cellular network covering a highway with exemplary cell switching locations overlaid in accordance with the present invention.

FIG. 7 gives an exemplary view of how RF cell switching locations relate to a route map. Three cell coverage areas are shown on the visible section of a highway. By analyzing the effectiveness of connecting to various cells the system has determined by a the combination of calculations and iteration described in this patent where the optimum locations are that should trigger a cell handover. For a given handover region a single RF cell switching location could be used for both directions of traffic on the route but alternatively as shown there could be additional locations for each direction of traffic and also for other variations such as which lane the vehicle is believed to be traveling along and vehicle type.

When used with radio systems capable of a soft handover a secondary set of adaptively determined absolute or relative locations may be defined to allow the separation of when negotiations with the new cell are commenced and when actual data flows should be transferred to the new cell. This allows initial negotiations to start closer to the edge of the new cell where signal to noise ratios are not sufficient to achieve the desired data rates but are sufficient for the negotiation process. Alternatively a soft handover could be commenced from a single set of locations and the data transfer time determined by a combination of one or more methods such as the completion of negotiations with the new cell, a predetermined time delay or a speed of travel related time delay.

Figure 8:
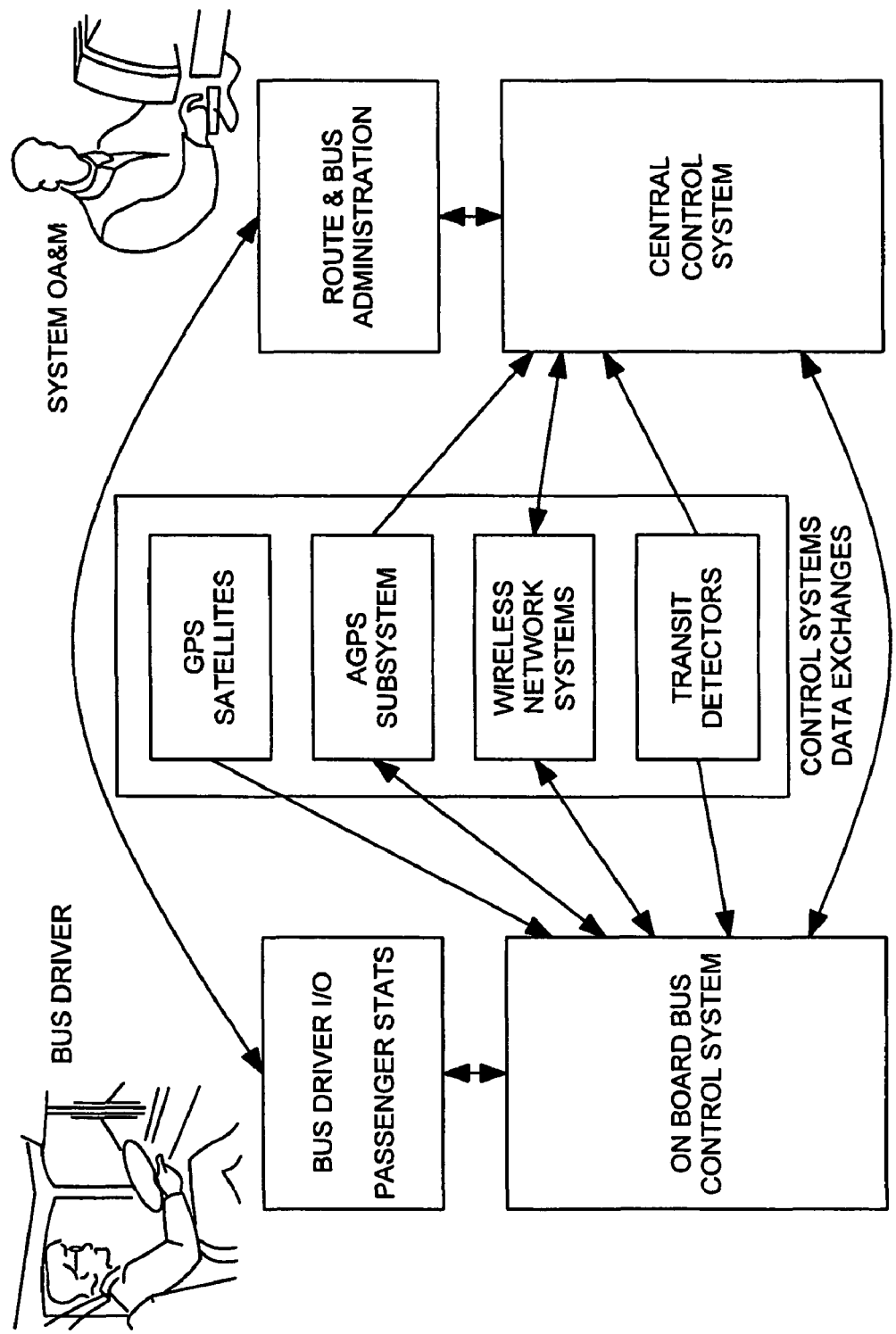
FIG. 8 is a block diagram exemplifying the information control loops in accordance with the present invention.

In order for the present inventive method and system to function, several loops should exist in terms of information control. FIG. 8 is a block diagram exemplifying the desired information control loops in accordance with the present invention between the bus driver and the system operator—i.e., system operations, administration, and management (OA&M). An information control loop will of course exist between the bus driver and the system operator. This may include input/output (I/O) information such as passenger statistics and other data provided by the bus driver to the systems operator and specific route or administrative information from the systems operator to the bus driver. A series of information control loops may also exist between an on-board bus control system and the central control system where each such loop may utilize one or more element such as, but not limited to, GPS satellites, APGS subsystems, wireless network systems, and transit detectors (e.g., buried resonant coils). Each such element has been already described hereinabove.

Additionally, an information control loop may directly exist (e.g., on a direct control channel) for direct data exchange between the on-board control system and the central control system. The direct control channel may exist by a separate radio within or in conjunction with the MSS on the bus. Direct human intervention may also be required from time to time such that information control loops should exist between the bus driver and the on-board control system and as between the system operator and the central control system. Implementation of all such information control loops is well within the understanding of one versed in computer information technology and is not discussed further herein. The information control loops can be configured to provide system management and optimized handover in several ways. Three such ways are shown by way of FIGS. 9 through 11. While the sequences of operations within the system may vary from those shown in FIGS. 9 through 11, such sequences are numbered items (i.e., C1, C2, C3, ... etc) for purposes of illustrative clarity indicating communications channels or connections.

Figure 9:
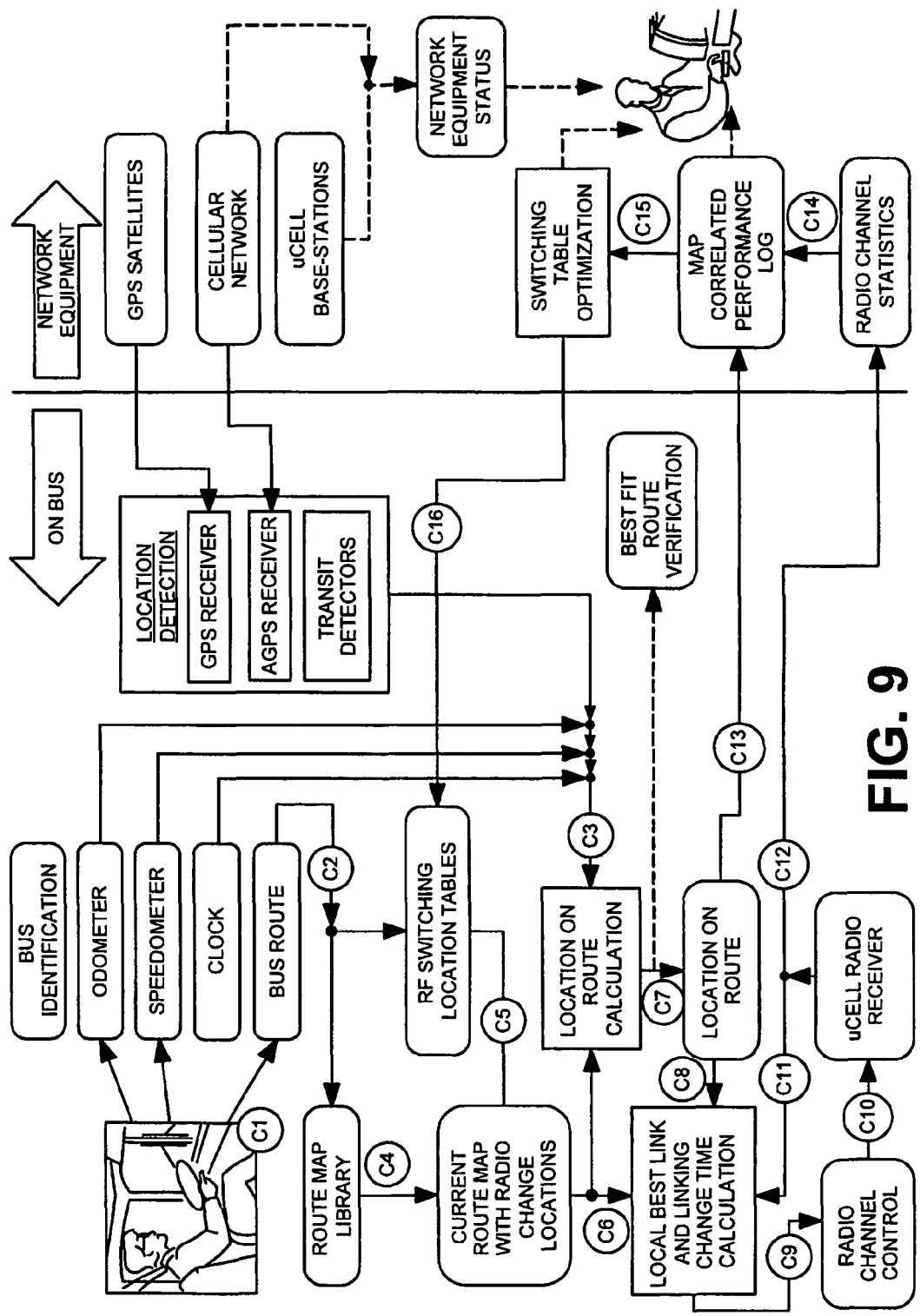
FIG. 9 is a relatively detailed diagram of one embodiment of the management system in accordance with the present invention with on-board route optimization.

FIG. 9 is a relatively detailed diagram of one embodiment of the management system in accordance with the present invention with an on-board management system for a bus with an on-board route optimization mechanism. In this exemplary embodiment of the invention, the system is supplied with starting parameters (at C1) such as the bus identification and planned route. This information could be a manual input from the bus driver, from the network, or be derived from other bus hardware such as electronic route signs. This information is used to determine which route map to use and select which data in stored RF switching location tables should (at C2) be applied (at C4 and C5) to that route.

Ongoing location and relative-location information is determined using (at C3) technologies such as GPS, cell phone network Assisted GPS (AGPS), wireless transit beacons, the busses odometer and time. Where GPS inaccuracies are significant, relative movement knowledge determined by the bus's odometer can be used to give an improved accuracy. This is done by tracing along the route from known accurate locations (such as areas where GPS is known to have good coverage) or from known features that can be detected in the location information (such as turning corners or stops at known bus stops). The time to instruct the radio to change cell association can be determined from when the bus approaches the pre-determined tabled radio change locations on the route. The change times may be further refined by taking into account the busses travel speed and the exact lane it is traveling in. When the cell switching time is reached, the radio is instructed to make the change. The identity of which cell to connect to next is already known from the tables (at C6, C7, C8, and C13) and the cell switching (at C9 and C10) can be done without searching the air for the best connection.

At all times, the cell radio receiver (at C11 and C12) can report parametric information on the quality of the link. This can be used to further refine (at C14 and C15) the switching times and prevent non-optimum linking to cells that are delivering non-typical performance. This information can be logged and correlated against the bus's location on the route. The stored switching tables can be adjusted by analyzing signal strengths, connectivity durations, and achieved data rates in an iterative fashion for the next time the bus takes that route. Statistics from the bus and from the networked wireless equipment can be fed to a central management system for record keeping and future system improvement work. Additionally, centrally known changes to routes due to road works, weather conditions, equipment failures, and other bus route effecting parameters could be transmitted to the bus (at C16) and included in the switching table optimization.

Figure 10:
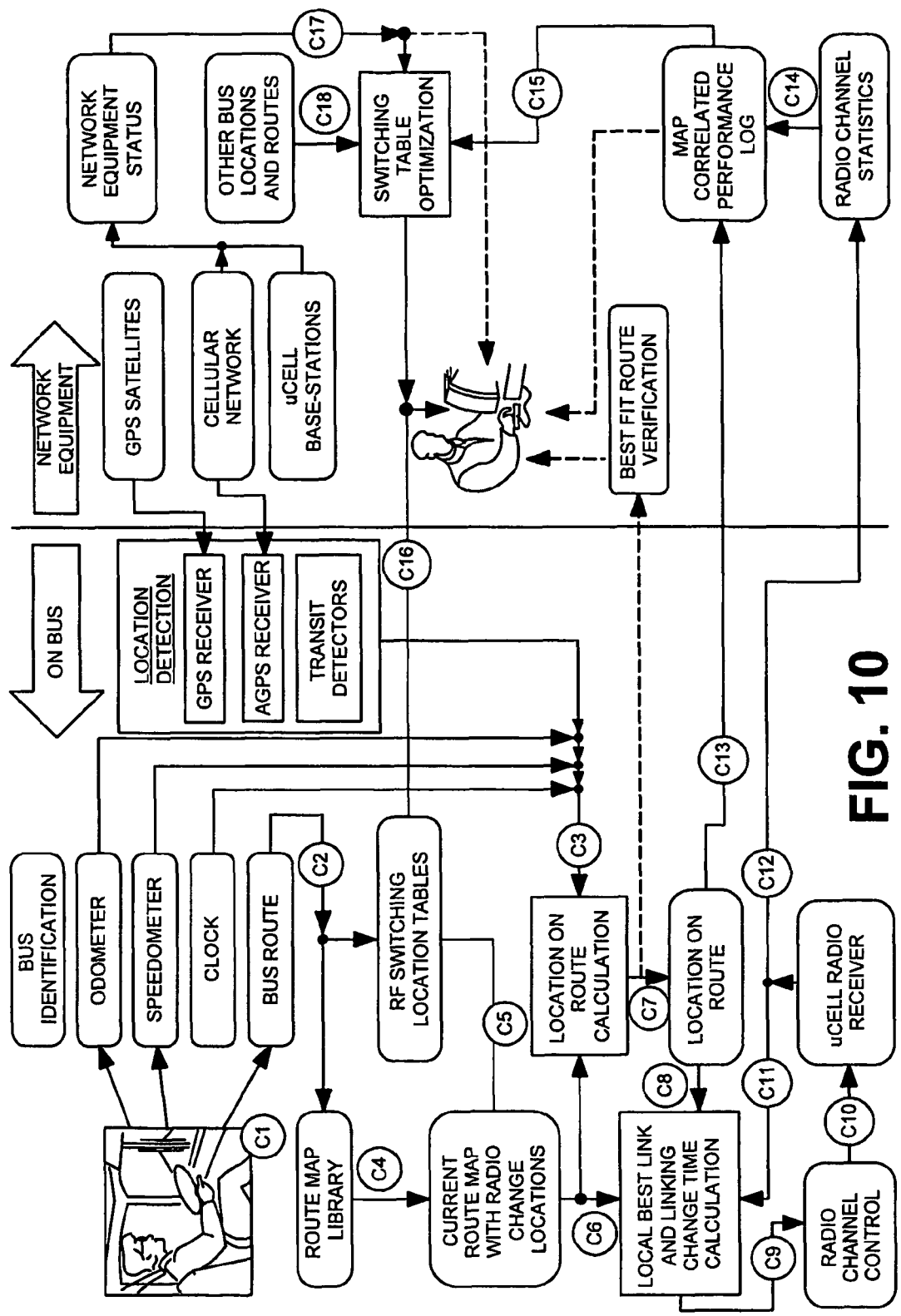
FIG. 10 is a relatively detailed diagram of another embodiment of the management system in accordance with the present invention with centralized route optimization.

FIG. 10 is a relatively detailed diagram of another embodiment of the management system in accordance with the present invention with an on-board management system for a bus with a centralized route optimization mechanism. The system shown in FIG. 10 is similar to that shown in FIG. 9 except that the radio channel statistics, map correlation to performance, and the switching tables optimization are migrated to a centrally located system. This allows additional information (at C17 and C18) to be included in the optimization such as network equipment status and performance statistics, the effect of loading from other buses and vehicles in the region where the bus is, and operational changes such as equipment under repair, route changes due to road works, ... etc. Route maps may also be updated by this system as required.

Figure 11:
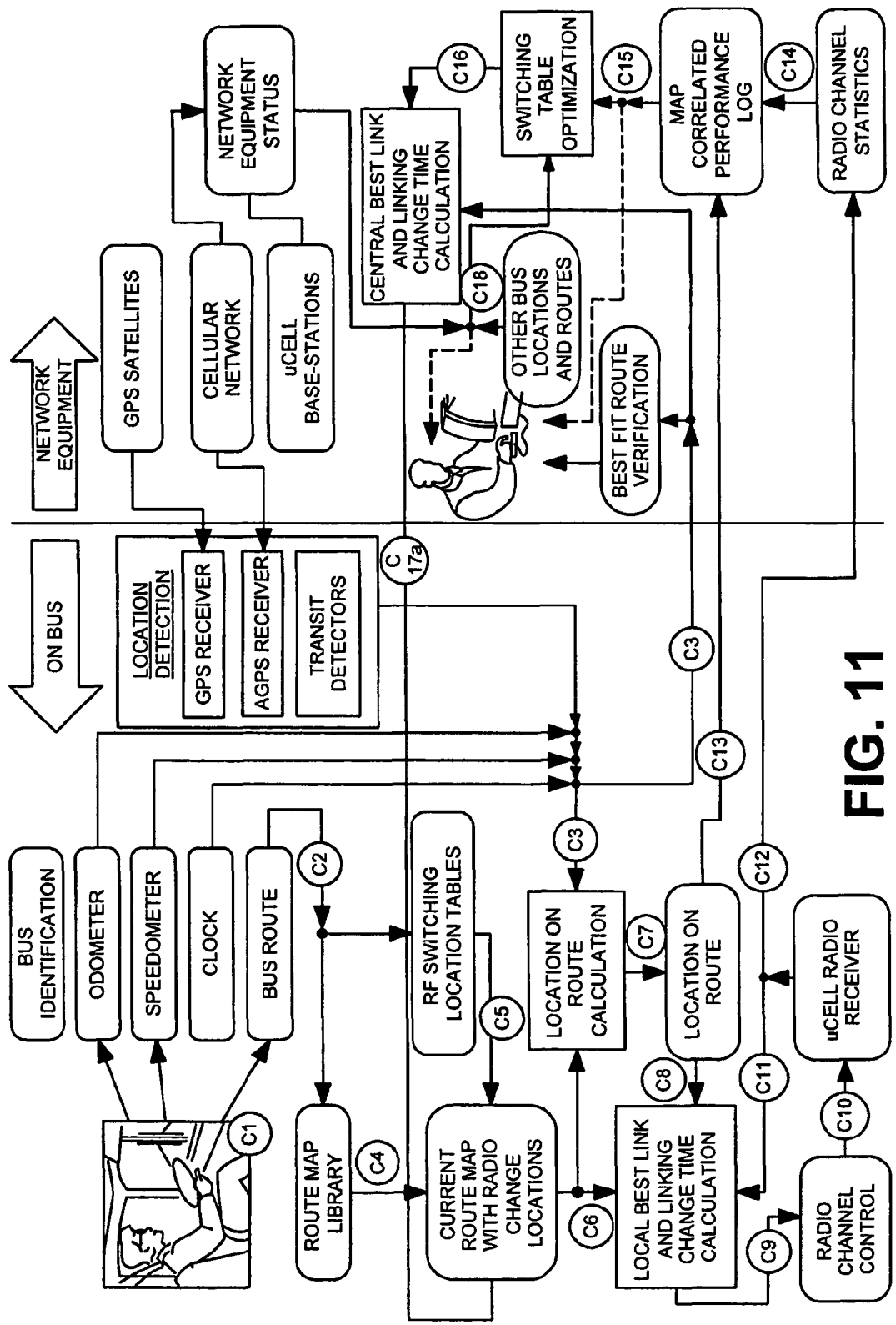
FIG. 11 is a relatively detailed diagram of yet another embodiment of a more centralized management system in accordance with the present invention with centralized route optimization.

FIG. 11 is a relatively detailed diagram of yet another embodiment of a more centralized management system in accordance with the present invention with the primary on board management system that is normally overruled by a centralized management system while communications are working. When communications or centralized systems fail the primary on-board management system is capable of operating on its own. Route optimization is performed centrally.

The system shown in FIG. 11 is similar to that shown in FIG. 10 except that a secondary control system located centrally has been added that calculates the best link and linking change times (at C17a) using information from the bus plus being able to make use of additional centrally based knowledge such as the latest information of road works, weather, network equipment status, other busses proximity and expected passenger loads (at C18). When communications with the bus are working, the secondary management system can override the on board system. However, when links fail the bus still has its own system that it uses to try and regain communications.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A method of managing handover within a radio cellular environment, said method comprising:
   determining an identification of a mobile station that is known to normally follow a predetermined route corresponding to said identification;
   determining a direction of travel of the mobile station along the predetermined route; and
   in accordance with the identification of the mobile station and with the direction of travel of the mobile station:
      comparing said identification and direction of travel with a database having stored maps of route segments of the predetermined route, the route segments corresponding to unalterable sections of the predetermined route, each route segment having associated thereto a list of base stations located therealong; and
      assigning a sequence of base stations corresponding to one or more of said route segments along said predetermined route, the sequence of base stations representing a sequential list of base stations to be used when the mobile station travels along the predetermined route.

2. The method as claimed in claim 1, wherein said identification determines information including ongoing location and relative-location information over absolute time and relative time including one or more units of time.

3. The method as claimed in claim 2, wherein said information includes a unique route identifier.

4. The method as claimed in claim 3, wherein said information further includes geographical location information corresponding to said mobile station.

5. The method as claimed in claim 4, wherein said information further includes time of day information.

6. The method as claimed in claim 5, wherein said information further includes speed information corresponding to movement of said mobile station.

7. The method as claimed in claim 1, wherein said direction of travel is obtained from a directional indication mechanism on board a vehicle upon which said mobile station resides.

8. The method as claimed in claim 7, wherein said method further includes storing locally on board said vehicle said maps that include said route segments corresponding to said sequence of base stations.

9. The method as claimed in claim 8, wherein said database is centrally stored at a central server.

* * * * *